United States Patent Office 3,502,470
Patented Mar. 24, 1970

3,502,470
COMPOSITION AND PROCESS FOR PHOTO-CHEMICAL CROSS-LINKING OF POLYMERS
Gerard Albert Delzenne and Urbain Leopold Laridon, Wilrijk-Antwerp, Belgium, assignors to Gevaert-Agfa N.V., Mortsel-Belgium, a Belgian company
No Drawing. Filed Feb. 8, 1967, Ser. No. 614,542
Claims priority, application Great Britain, Feb. 28, 1966, 8,728/66
Int. Cl. G03c 5/00, 1/70, 1/52
U.S. Cl. 96—35.1                                   9 Claims

ABSTRACT OF THE DISCLOSURE

A process is described for the photochemical cross-linking of a light-sensitive composition, comprising exposing to actinic light rays a composition comprising (A) a polymeric material carrying groups which are reactive with intermediates derivable from the photochemical decomposition of quinone diazide groups, and (B) quinone diazide groups present either in the same polymeric material or in a separate polymeric material mixed with said polymeric material containing reactive groups. The cross-linked compositions are insoluble and infusible materials and accordingly are advantageous in the production of printing plates and etching resists.

---

The present invention relates to a process for the photochemical cross-linking of polymers, to the production of printing plates and etching resists and to printing plates and etching resists obtained by this process.

According to the invention a process is provided for the photochemical cross-linking of a light-sensitive composition, which process comprises exposing to actinic light rays a composition comprising (A) a polymeric material carrying groups that are reactive with intermediates deriving from the photochemical decomposition of quinone diazide groups, and (B) quinone diazide groups present either in the same polymeric material or in a separate polymeric material mixed with said polymeric material carrying reactive groups.

The polymeric material carrying quinone diazide groups may be obtained by reacting a hydroxyl group-containing polymer with a quinone diazide containing a chlorosulphonyl or chlorocarbonyl group, whereby at least some of the hydroxyl groups of the polymer are esterified with said chlorosulphonyl or chlorocarbonyl group.

As compounds containing quinone diazide groups that can be made to react with hydroxyl groups-containing polymers may be mentioned, e.g., naphthoquinone-1,2-diazide(2) - 5 - sulphochloride, naphthoquinone - 1,2-diazide(2)-4-sulphochloride, and their derivatives wherein the naphthalene nucleus is substituted by halogen atoms, lower alkyl groups, nitro groups and/or alkoxy groups; further, the homologues of the above compounds comprising chlorocarbonyl substituent instead of chlorosulphonyl substituents.

The hydroxyl groups-containing polymers, which are used as starting materials for the manufacture of light-sensitive materials, may be natural polymers, chemically modified natural polymers, synthetic polymerisation-, polycondensation- or polyaddition products, as long as they possess in their structure free hydroxyl groups capable of reacting with quinone diazides containing a chlorosulphonyl or a chlorocarbonyl group.

Among the natural polymers, which may be made to react with quinone diazides containing a chlorosulphonyl or a chlorocarbonyl group, may be mentioned cellulose, starch, dextrin and the like. Suitable chemically modified natural polymers are the partial esters and ethers of the above natural polymers, provided they still contain in their structure a substantial proportion of free hydroxyl groups, such as hydroxymethyl cellulose and hydroxyethyl cellulose.

Synthetic polymerisation products, which may be made to react with the quinone diazides containing a chlorosulphonyl or a chlorocarbonyl group are, e.g. poly(vinyl alcohol) and copolymers comprising in their structure besides a substantial amount of vinyl alcohol units, recurring units deriving from one or more other ethylenically unsaturated monomers. These monomers may be, e.g., styrene, vinyl chloride, vinylidene chloride, vinyl esters, vinyl ethers, acrylic and methacrylic acid esters, acrylonitrile, methacrylonitrile, butadiene, and the like.

In the same way the copolymer containing vinyl alcohol units may comprise recurring units deriving from monomers having more than one ethylenically unsaturated bond, such as divinylbenzene, diglycol, diacrylates, N,N'-alkylene-bis-acrylamides, N,N - diallyl - acrylamide, ethylene diacrylate and triallyl cyanurate.

Synthetic condensation products carrying hydroxyl groups are, e.g., polyamides carrying hydroxymethyl or hydroxyethyl substituents, and epoxy resins, such as the polyether obtained by the polycondensation of 2,2-bis(4-hydroxyphenyl)-propane and epichlorohydrin.

All these natural and synthetic polymeric materials are reactive with quinone diazides containing a chlorosulphonyl or a chlorocarbonyl group, for they all possess free hydroxyl groups in their polymeric structure. The quinone diazide-substituted polymers obtained are light-sensitive. Indeed, under the influence of light the quinone diazide groups are decomposed, probably into ketocarbene radicals. When in the light-sensitive material not all the hydroxyl groups are replaced by quinone diazide substituents, the remaining free hydroxyl groups immediately will react with the ketocarbene radicals, whereby the polymeric material is cross-linked to the insoluble state.

The above indicated photochemical reaction is only given by way of explanation of what really occurs when the light-sensitive polymeric material carrying both free hydroxyl groups and quinone diazide groups is exposed to actinic light rays. The invention, however, is independent of the real reaction which occurs and of whatever the mechanism of cross-linking may be.

The photochemical decomposition products of the quinone diazide groups are not only reactive with hydroxyl groups but with a large number of other reactive groups, such as thiol groups, amino groups, carbon-to-carbon unsaturated bonds, and phenyl groups. When the light-sensitive polymeric material contains one or more of these kinds of reactive groups distributed along its polymeric chain, a cross-linking reaction as was the case with the hydroxyl groups will also immediately occur on exposure to light.

When starting from a soluble polymer carrying reactive groups as described above together with quinone diazide substituents, the exposure to actinic light rays induces the cross-linking reaction to take place thereby insolubilizing the polymeric material in the solvents in which it was previously soluble. The ratios of quinone diazide groups to reactive groups in the soluble polymeric material are fully determined by the structure of the polymer itself and can be varied over a whole range of concentrations.

According to a special embodiment of the invention, the light-sensitive composition is formed by a mixture of one polymer carrying quinone diazide substituents and another polymer carrying groups, which are reactive with the photochemical decomposition products of quinone diazide groups for instance as described above. When such a mixture is exposed to actinic light, a photochemical cross-linking between the two polymers will occur immediately whereby the mixture is cross-linked to the insoluble state. When speaking in the following description and claims of a light-sensitive polymeric material carrying quinone diazide substituents, there is to be understood one and the same polymer carrying both reactive groups and quinone diazide substituents as well as, i.e. alternatively, a mixture of two polymers, the first of which carries the reactive groups and the other one bearing the quinone diazide substituents.

Besides the light-sensitive polymeric material carrying reactive groups and quinone diazide substituents, or alternatively the mixture of a polymer carrying reactive groups and of a light-sensitive polymer bearing quinone diazide substituents, the light-sensitive composition, i.e., material may also comprise other polymers, plasticizers, extenders, and the like.

Cross-linking and thus insolubilization of the light-sensitive polymeric composition in the solvents wherein it was previously soluble can be effected by simply exposing it to actinic light rays. The light-source should preferably furnish an effective amount of ultraviolet radiation. Suitable sources of light include carbon arcs, mercury vapour lamps, fluorescent lamps, argon glow lamps, photographic flood lamps, and tungsten lamps.

For initiating the photochemical cross-linking by means of the quinone diazide substituents a very strong light source is not needed. In most of the examples described hereinafter, an 80-watt mercury vapour lamp placed at a distance of about 15 cm. from the surface to be cross-linked, is used. In some examples a 300-watt tungsten lamp is used.

In the photochemical cross-linking of polymeric materials carrying quinone diazide substituents high temperatures are not needed. The exposure, however, to strong light sources at a relatively short distance brings about a certain heating of the mass to be cross-linked, which heating exercises a favourable influence upon the cross-linking rate.

It has been found that the polymeric material carrying quinone diazide substituents and reactive groups is light-sensitive in the sense that its exposure to light causes it to be rendered insoluble in the solvents in which it was soluble before exposure, due to a cross-linking reaction which has occurred between the reactive groups and the photochemical decomposition products of the quinone diazide substituents. Thus if a layer of such a light-sensitive polymeric material is applied to a support from a solution in a solvent and that layer is exposed to actinic light-rays, the polymeric material becomes insoluble in the solvent. If only some areas of the layer are exposed, the nonexposed areas remain unchanged and can be washed away with the same solvent, whereas the exposed areas are insolubilised in that solvent and remain on the support.

The light-sensitive compositions of the invention are valuable in the formation of plates and films wholly made of the light-sensitive polymeric composition. They can also be used in the formation of coated printing films on any base by the deposition of films or coatings of the photosensitive polymeric material according to any known process. Suitable bases are metal sheets (e.g. copper, aluminium, zinc, magnesium, etc.), glass plates, cellulose ester film, poly(vinyl acetal) film, poly(styrene) film, poly(carbonate) film, poly(ethylene terephthalate) film, paper, nets of metal, e.g., of bronze and steel, as well as of polyamides, such as nylon fabrics.

The base or support can be coated with a solution of the light-sensitive polymeric composition in a suitable solvent, whereupon the solvent or solvent mixture is eliminated by known means such as evaporation, thus leaving a more or less thin coating of the light-sensitive polymeric composition upon the base or support. The light-sensitive coating is then ready for exposure to actinic light rays.

When a base or support component is used, which is light-reflecting, there may be present, e.g. superimposed on said base or support component and adherent thereto, or in the surface thereof, a layer or stratum absorptive of actinic light such as to minimize reflectance from the support of incident actinic light.

Plates formed wholly of or coated with the photosensitive polymeric compositions are useful in photography, photomechanical reproductions, lithography and intaglio printing. More specific examples of such uses are offset printing, silk screen printing, manifold stencil sheeting coatings, lithographic plates, relief plates, and gravure plates. The term "printing plates" is inclusive of all of these and thus includes both flexible material (e.g., self-sustaining layers of the said composition or sheet-material comprising a layer of such composition on paper or other flexible backings) as well as rigid materials comprising a rigid backing.

A typical procedure according to the invention for preparing a printing plate or an etching resist is as follows. A layer of the light-sensitive composition forming a self-sustaining film or sheet, or applied as a coating to a backing, usually of metal, is exposed to light through a contacted transparency, e.g., a process positive or negative (consisting solely of opaque and transparent areas, e.g., the so-called line or half-tone negative or positive) where the opaque areas are of the same optical density. The light induces the cross-linking reaction, which insolubilizes the areas of the surface beneath the transparent portions of the image, whereas the areas beneath the opaque portions of the image remain soluble. The soluble areas of the surface are then removed by a solvent, the so-called developer, and the insoluble raised portions of the film, which remain, can serve as a resist image, whereas the exposed base material is etched, forming a relief plate, or the plate can be inked and used as a relief printing plate directly in the customary manner.

After washing away the nonexposed and thus soluble parts of the layer or film, the polymer parts made insoluble by exposure to actinic light may be subjected, if desired, to other known hardening techniques. Of course, these hardening techniques will depend upon the kind of the light-sensitive polymer used. When, e.g., the original polymer is an epoxy resin of 2,2-bis(4-hydroxyphenyl)-propane and epichlorohydrin, which carries quinone diazide groups, the insolubilised polymer part remaining after exposure and development can be further hardened according to techniques known for epoxy resins. The purpose of this additional hardening is to strengthen the insolubilised polymer parts as much as possible. If, e.g., the remaining insolubilized polymer surface is to be used as a printing plate, similar subsequent hardening is often desirable.

The thickness of the light-sensitive layer is a direct function of the thickness desired in the relief image and this will depend on the subject being reproduced and particularly on the extent of the nonprinting areas. In the case of haltones, the nature of the screen used is also a factor to be taken into account. In general, the thickness of the light-sensitive layer is suitable within the range from about 0.001 mm. to about 7 mm. Layers ranging from about 0.001 to about 0.70 mm. in thickness are in general suitable for halftone plates. Layers ranging from about 0.25 to about 1.50 mm. in thickness are in general suitable for the majority of letterpress printing plates.

The solvent liquid used for washing or "developing" the printing plates made from the light-sensitive polymeric composition must be selected with care, since it should have good solvent action on the unexposed areas, yet have little action on the hardened image or upon any base material, antihalation layer, or subbing layer with which the light-sensitive polymeric composition may be anchored to the support.

When the light-sensitive polymeric composition is to be applied to a metal support, the polymeric material is preferably selected from polyvinylbutyrals and polyepoxy resins which are known to have a greater adhesivity to metals.

The light-sensitive polymeric compositions of the present invention are suitable for other purposes in addition to the printing uses described above.

The surface of a film or layer of a somewhat sticky light-sensitive polymeric composition can be treated with a powder after image-wise exposure to light. The exposed areas are hardened and have lost their stickiness. As a consequence the powder is taken up only by the unexposed areas and the powder-image thus formed can be used in transfer processes.

The light-sensitive polymeric compositions are suitable for other purposes as well, e.g., as ornamental plaques or for producing ornamental effects, as patterns for automatic engraving machines, foundry molds, cutting and stamping dies, name stamps, relief maps for braille, as rapid cure coatings, e.g. on film base, as sound tracks on film, for embossing plates, paper, e.g., with a die prepared from the light-sensitive compositions, in the preparation of etched circuits, and in the preparation of other plastic articles.

The following examples illustrate the present invention.

In the formulae of the examples, the group "=N$_2$" is intended to cover the alternative forms of the diazide group, namely

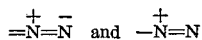

EXAMPLE 1

In an Erlenmeyer flask 40 g. of polyether prepared by polycondensation of 2,2 - bis(4-hydroxyphenyl) - propane and epichlorohydrin are dissolved in a mixture of 200 ml. of methylene chloride and 20 ml. of pyridine. Then 33 g. of naphthoquinone-1,2-diazide(2)-5-sulphochloride are added and the obtained solution is allowed to stay in the dark for 24 hours at room temperature. The solution is then diluted with methylene chloride, filtered and poured into ethanol. The precipitated polymer is filtered off. Yield: 52 g. of a polymer composed of recurring units randomly distributed over the polymer chain and corresponding to the formulae:

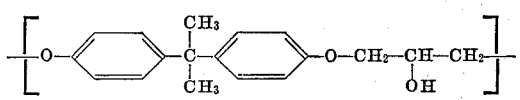

and

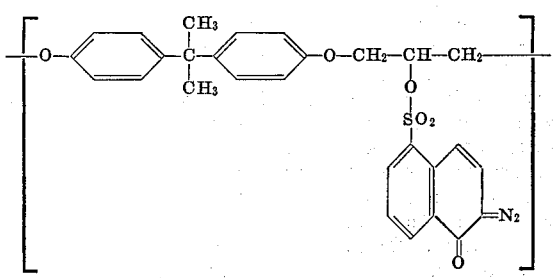

These units are present in the polymer chain in a proportion of 2:1.

An amount of 0.025 g. of this polymer is dissolved in a mixture of 2 ml of methylene chloride and 1 ml. of sym.-tetrachloroethane. This solution is coated on an aluminium plate in such a way that after drying a layer of 1μ thickness is obtained. This layer is exposed through a negative or positive line original at a distance of 15 cm. whereupon it is developed with a mixture of equal parts of methylene chloride and sym.-tetrachloroethane.

In order to obtain a good relief image an exposure time of 5 sec. by means of an 80-watt mercury vapour lamp suffices, whereas 30 sec. are needed when using a common 300-watt lamp.

EXAMPLE 2

In an Erlenmeyer flask 1.4 g. of polyether prepared by polycondensation of 2,2-bis(4-hydroxyphenyl)-propane and epichlorohydrin are dissolved in 15 ml. of methylene chloride and 1 ml. of pyridine. Then 1.6 g. of naphthoquinone-1,2-diazide(2)-4-sulphochloride are added and the obtained solution is allowed to stay in the dark for 24 hours at room temperature. The solution is then diluted with 20 ml. of methylene chloride, filtered and poured into ethanol. The precipitated flaky product is filtered off and dried under reduced pressure. Yield: 1.5 g. of a polymer composed of recurring units randomly distrbuted over the polymer chain and corresponding to the formulae:

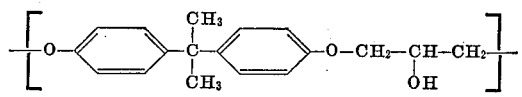

and

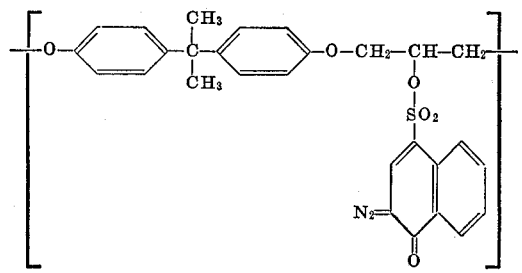

These units are present in the polymer chain in a proportion of 3.5:1.

The further procedure is that of Example 1.

In order to obtain a good relief image, an exposure time of 15 sec. by means of an 80-watt mercury vapour lamp suffices, whereas 2 min. are needed when using a 300-watt tungsten lamp.

EXAMPLE 3

In a flask 3 g. of poly(vinyl butyral) containing still 20% of free hydroxyl groups are dissolved in a mixture of 30 ml. of methylene chloride and 1.5 ml. of pyridine. Then 1.6 g. of naphthoquinone-1,2-diazide (2)-5 sulphochloride is added and the reaction mixture is allowed to stay in the dark for 48 hours at room temperature. The reaction mixture is then poured into ether and the precipitated flaky product is collected. This product is redissolved in alcohol and the solution obtained poured into water. The formed precipitate is filtered off and dried under reduced pressure. Yield: 2 g. of polymer composed of recurring units randomly distributed over the polymer chain and corresponding to the formulae:

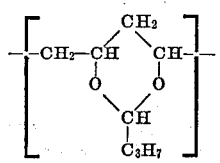

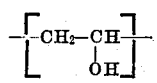

and

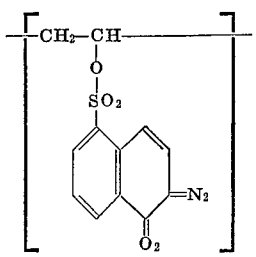

These units are present in the polymer chain in a proportion of 20:4:1.

Of this polymer an amount of 0.025 g. is dissolved in a mixture of 2 ml. of methylene chloride and 1 ml. of sym.-tetrachloroethane. The further prodecure for applying a layer to aluminium, exposing and developing of the relief image is that of Example 1. In order to obtain a good image an exposure time of 45 sec. by means of an 80-watt mercury vapour lamp suffices, whereas 1 min. is needed when using a 300-watt tungsten lamp.

EXAMPLE 4

The process of Example 3 is repeated, but the naphthoquinone-1,2-diazide(2)-5-sulphochloride is replaced by a same amount of naphthoquinone-1,2-diazide(2)-4-sulphochloride, and the reaction mixture is allowed to stay in the dark for only 24 hours at room temperature. The obtained polymer is composed of recurring units randomly distributed over the polymer chain and corresponding to the formulae:

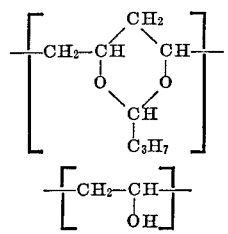

and

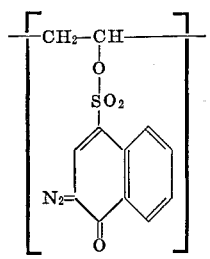

These units are present in the polymer chain in a proportion of 40:8:1.

In the same way as in Example 1, a layer is applied to aluminium whereafter it is exposed through a line original and developed. In order to obtain a good relief image an exposure time at 7 sec. by means of an 80-watt mercury vapour lamp suffices, whereas 1 min. is needed when using a common 300-watt tungstem lamp.

We claim:

1. Process for the photochemical cross-linking of a light-sensitive composition to provide an insoluble product, which comprises exposing to actinic light rays a composition comprising (A) a polymeric material carrying groups that are reactive with intermediates deriving from the photochemical decomposition of quinone diazide groups, and (B) quinone diazide groups either present as substituents in the same polymeric material or in a separate polymeric material mixed with said polymeric material carrying reactive groups.

2. Process according to claim 1, wherein the polymeric material contains the quinone diazide groups and is obtained by reacting a hydroxyl-group-containing polymer with a quinone diazide containing a chlorosulphonyl or chlorocarbonyl group.

3. Process according to claim 2, wherein the polymeric material carrying reactive groups is the reaction product of the polyether of 2,2-bis(4-hydroxyphenyl)-propane and epichlorohydrin with naphthoquinone-1,2-diazide(2)-5-sulphochloride.

4. Process according to claim 2, wherein the polymeric material carrying reactive groups is the reaction product of the polyether of 2,2-bis(4-hydroxyphenyl)-propane and epichlorohydrin with naphthoquinone-1,2-diazide(2)-4-sulphochloride.

5. Process according to claim 2, wherein the polymeric material carrying reactive groups is the reaction product of a partial polyvinylbutyral containing a substantial proportion of free hydroxyl groups with naphthoquinone-1,2-diazide(1)-5-sulphochloride.

6. Process according to claim 2, wherein the polymeric material carrying reactive groups is the reaction product of a partial polyvinylbutyral containing a substantial proportion of free hydroxy groups with naphthoquinone-1,2-diazide(2)-4-sulphochloride.

7. A light-sensitive composition, which undergoes photochemical cross-linking to provide an insoluble product upon exposure to actinic light rays, comprising (A) a polymeric material carrying groups that are reactive with intermediates deriving from the photochemical decomposition of quinone diazide groups, and (B) quinone diazide groups either present as substituents in the same polymeric material or in a separate polymeric material mixed with said polymeric material carrying reactive groups.

8. Process for producing a photographic etching resist or a photographic printing plate by the photochemical cross-linking of a polymeric material to provide an insoluble product, comprising exposing a photographic element to actinic light rays through a process transparency, said photographic element comprising a support having thereon a light-sensitive layer comprising a composition composed of (A) a polymeric material carrying groups that are reactive with intermediates deriving from the photochemical decomposition of quinone diazide groups, and (B) quinone diazide groups either present as substituents in the same polymeric material or in a separate polymeric material mixed with said polymeric material carrying reactive groups, whereby in the exposed areas said composition is cross-linked to the insoluble state and removing said composition in the unexposed areas with a solvent therefor, thereby forming a photographic etching resist or a photographic printing plate.

9. A photographic element comprising a support having thereon a light-sensitive layer comprising a composition, which undergoes photochemical cross-linking to provide an insoluble product upon exposure to actinic light rays, composed of (A) a polymeric material carrying groups that are reactive with intermediates deriving from the photochemical decomposition of quinone diazide groups, and (B) quinone diazide groups either present as substituents in the same polymeric material or in a separate polymeric material mixed with said polymeric material carrying reactive groups.

References Cited

UNITED STATES PATENTS 3,288,608 11/1966 Coutaud et al. ———————— 96—115
3,278,305 10/1966 Laridon et al. ———————— 96—115

RONALD H. SMITH, Primary Examiner

U.S. Cl. X.R.

96—115.91